United States Patent [19]

Hodgson et al.

[11] Patent Number: 4,769,222

[45] Date of Patent: Sep. 6, 1988

[54] METHOD OF DISSOLVING NUCLEAR MATERIAL FROM A NUCLEAR FUEL CARTRIDGE

[75] Inventors: Thomas D. Hodgson, Abingdon; Tony W. J. Jordan, Cholsey, both of England

[73] Assignee: United Kingdom Atomic Energy Authority, London, England

[21] Appl. No.: 910,861

[22] Filed: Sep. 24, 1986

Related U.S. Application Data

[63] Continuation of Ser. No. 648,357, Sep. 7, 1984, abandoned, which is a continuation of Ser. No. 355,226, Mar. 5, 1982, abandoned.

[30] Foreign Application Priority Data

Mar. 13, 1981 [GB] United Kingdom ............... 8108043

[51] Int. Cl.[4] ................................. C01G 43/00
[52] U.S. Cl. ........................................... 423/4
[58] Field of Search ................................ 423/4

[56] References Cited

U.S. PATENT DOCUMENTS

| | | | |
|---|---|---|---|
| 3,034,868 | 5/1962 | Erickson | 423/4 |
| 3,192,122 | 6/1965 | Kelman et al. | 176/72 |
| 3,327,728 | 6/1967 | Huling | 137/254 |
| 3,580,809 | 5/1971 | Williams et al. | 176/76 |
| 3,607,107 | 9/1971 | Ayers | 423/4 |
| 3,679,378 | 7/1972 | Impe et al. | 423/4 |
| 4,011,296 | 3/1977 | Rutz et al. | 423/4 |
| 4,294,805 | 10/1981 | Hodgson et al. | 423/4 |
| 4,521,400 | 6/1985 | Hodgson et al. | 423/4 |

FOREIGN PATENT DOCUMENTS

| | | |
|---|---|---|
| 1031873 | 6/1966 | United Kingdom . |
| 1240517 | 7/1971 | United Kingdom . |
| 2028293 | 3/1980 | United Kingdom . |

OTHER PUBLICATIONS

Guralnik, *Webster's New World Dictionary*, 2nd College Ed., p. 1476, World Publ. Co., (1970), New York.

*Primary Examiner*—Edward A. Miller
*Attorney, Agent, or Firm*—Larson and Taylor

[57] ABSTRACT

A method of dissolving nuclear material from a relatively long length cut from a nuclear fuel cartridge and having a liquid permeable passageway extending from one end to the other end of the cut length. The method comprises holding the cut length upright in a dissolvent for the nuclear material in the cut length, so that gas generated by the dissolvent in reacting with the nuclear material produces an effect analogous to that of an air lift pump and circulates the dissolvent through the passageway.

8 Claims, 1 Drawing Sheet

U.S. Patent  Sep. 6, 1988  4,769,222
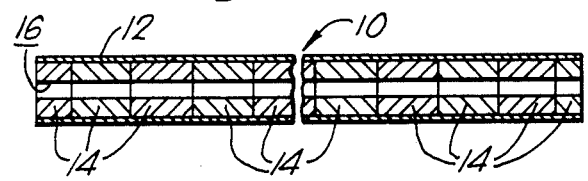
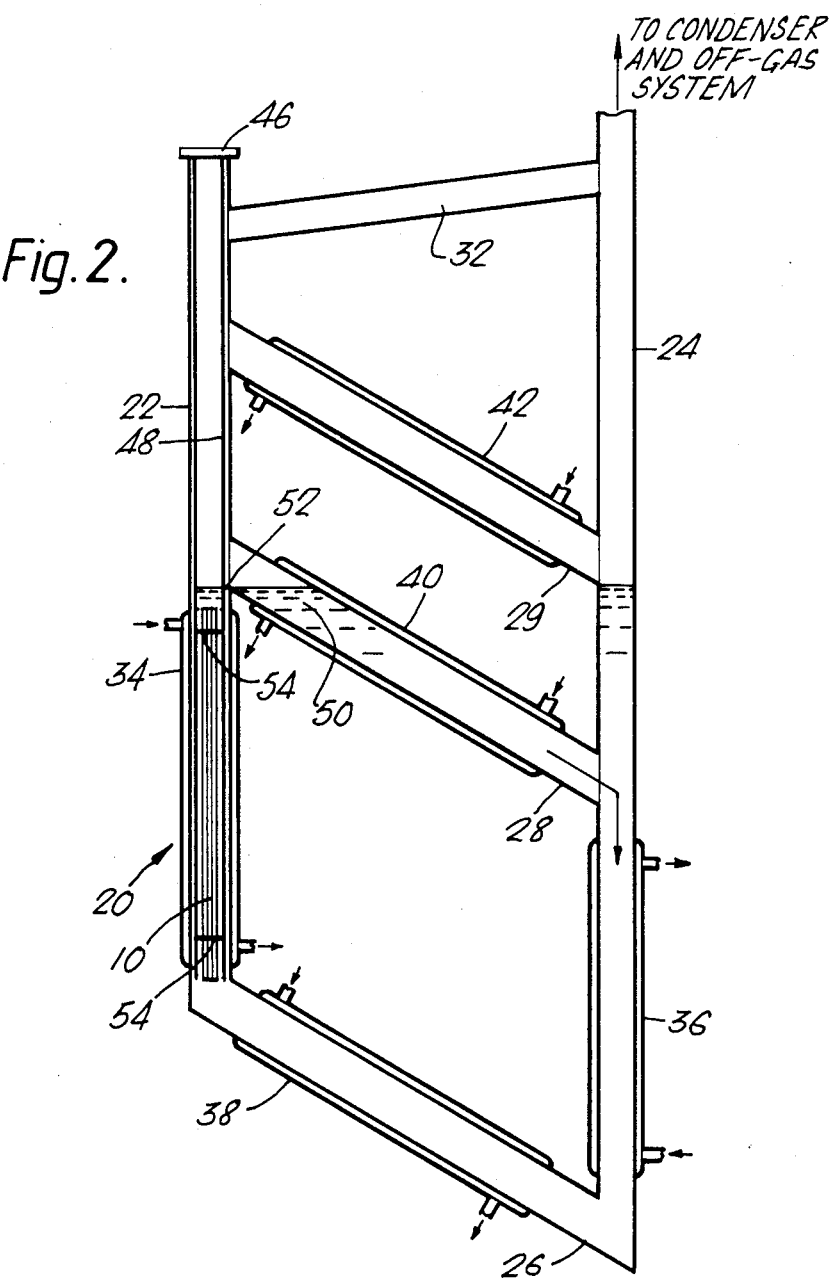

METHOD OF DISSOLVING NUCLEAR MATERIAL FROM A NUCLEAR FUEL CARTRIDGE

CROSS REFERENCE TO RELATED APPLICATIONS

This application is continuation of Ser. No. 648,357, filed Sept. 7, 1984, which is a continuation of Ser. No. 355,226, filed Mar. 5, 1982, both now abandoned.

This invention relates to a method and to an apparatus for dissolving nuclear material from an irradiated nuclear fuel cartridge.

A nuclear fuel cartridge which might also be termed a nuclear fuel element or a nuclear fuel pin, is generally of elongate form and comprises nuclear material in a protective sheath. The sheath might comprise stainless steel or an alloy of zirconium, and serves to retain fission products released during irradiation of the nuclear material in the cartridge as well as improving heat transfer between the nuclear material and a reactor coolant arranged to flow about the cartridge.

After irradiation in a nuclear reactor, an irradiated cartridge is subsequently treated in a nuclear reprocessing plant to extract from the cartridge nuclear material, and fission products. Conventional practice in the nuclear reprocessing industry is for the cartridge to be cut into relatively short lengths of from about 25 mm to 80 mm long to expose the nuclear material at each end of the short lengths to a dissolvent in which the short lengths are placed, the sheath portions of the short lengths being insoluble in the dissolvent. However, this cutting operation produces relatively large quantities of fines of the nuclear material and of the can, which must be recovered and results in considerable difficulties in maintaining the cutting device because of the radioactive environment in which it is situated. Furthermore the ends of the sheath portions of the short lengths may become pinched as a result of the cutting operation, thus inhibiting access of the dissolvent to the nuclear material and the fission products therein.

The invention therefore in a first aspect provides a method of dissolving nuclear material from a relatively long length cut from a nuclear fuel cartridge, there being a liquid permeable passageway extending from one end of the cut length to the other end thereof and defined at least in part by the nuclear material, the method comprising holding the cut length in a quantity of a liquid dissolvent for the nuclear material so that an end of the cut length is substantially lower than the other end thereof, which dissolvent generates a gas in reacting with the nuclear material in the cut length, whereby bubbles of said gas rise in the passageway and cause an upward flow of the dissolvent in the passageway, thereby causing circulation of said dissolvent through the passageway.

Preferably, the cut length is held substantially upright in the dissolvent and desirably the upper end of the cut length is near the surface of the dissolvent, either below or above said surface.

The cut length may be at least 150 mm long, preferably between 300 mm to 1000 mm long, and the passageway is desirably at least 0.5 mm wide.

The invention also includes in a second aspect an apparatus for dissolving nuclear material from a relatively long length cut from a nuclear fuel cartridge, the apparatus comprising a vessel for containing a dissolvent for nuclear material, an overflow at an intermediate position along the vessel, a recirculation circuit connecting the overflow to the lower end of the vessel, and a carrier means for holding substantially upright in the vessel at least one of the relatively long lengths.

Preferably, the carrier means is arranged to hold the cut length with the upper end thereof at or near the level of the overflow in the vessel, and may be either below or above the overflow.

Advantageously, a plurality of the said cut lengths may be held together in the dissolvent.

The invention will now be further described by way of example only with reference to the accompanying drawings in which:

FIG. 1 shows in median section a representation of a relatively long length cut from a nuclear fuel cartridge, and FIG. 2 shows in median section a side diagrammatic representation of a dissolver.

Referring now to FIG. 1, a relatively long length 10 (e.g. 1000 mm) is shown which has been cut from an irradiated nuclear fuel cartridge (not shown), and comprises a stainless steel sheath 12, and a plurality of irradiated nuclear fuel pellets 14 of annular form which define an axial passageway 16 through the cut length 10. The nuclear fuel in the pellets 14 might comprise uranium oxide, or a mixture of uranium and plutonium oxides.

In FIG. 2, an apparatus in the form of a dissolver 20 is shown which forms part of a nuclear fuel reprocessing plant (not shown). The dissolver 20 comprises two upright cylindrical vessels 22, 24 connected together by a base tube 26, by two recirculation tubes 28, 29 and by a vent tube 32, the recirculation tubes 28, 29 extending declivitously and the vent tube 32 extending acclivitously from the vessel 22. Between the base tube 26 and the recirculation tube 28, a steam jacket 34 is disposed about the vessel 22, and a jacket 36 for a cooling liquid disposed about the vessel 24, whilst a steam jacket 38 is disposed about the base tube 26 and respective jackets 40, 42 for a cooling liquid disposed about the recirculation tubes 28, 29. A removable cap 46 at the top of the vessel 22 supports a carrier frame 48 which extends downwardly into the vessel 22 to the base tube 26. The dissolver 20 contains nitric acid 50 to an overflow or weir which, as illustrated, is 52 defined by the junction between the vessel 22 and the recirculation tube 28, and a plurality of the cut lengths 10 of FIG. 1 are attached to the carrier frame 48 by two spaced apart clamp members 54 such that the upper ends of the cut lengths 10 are just below the surface of the nitric acid 50. The upper end of the vessel 24 is connected to a condenser (not shown) and an off-gas system (not shown) of the reprocessing plant.

In operation, the nitric acid 50 is maintained near boiling (80° C.+) by the steam jackets 34, 38 whilst cold water passed through the cooling jackets 36 and 40 produces thermo-siphon circulation of the nitric acid 50. The nitric acid 50 enters the passageways 16 (not shown in FIG. 2) of the cut lengths 10 and reacts with the nuclear fuel thereof, gas—mainly $NO_2$ and NO—being generated and rising in the passageways 16. This gas produces an effect on the nitric acid 50 inside the passageways 16 analogous to that of an air lift pump, since the gas mixes with the nitric acid 50 in the passageways 16 and results in the density of the mixture of the gas and the nitric acid 50 in the passageways 16 being less than that of the static head of the nitric acid 50 in the vessel 22 at the lower ends of the passageways 16. Thus fresh nitric acid 50 flows from the vessel 22 into the lower ends of the passageways 16, and the mixture of the gas and the nitric acid 50 in the passageways 16 rises and is ejected from the upper ends of the passageways 16 into the vessel 22. This circulation of the nitric acid 50 through the passageways 16 from the effect produced by the gas generated in the passageways 16 continues until the nuclear fuel in the cut lengths 10 has been dissolved, the saturated nitric acid 50 being removed from the dissolver 20 by conventional means, for example by use of a jet pump (not shown).

The recirculation tube 29 provides an additional overflow in the event of the level of the nitric acid 50 rising in the vessel 22 as a result of a vigorous reaction between the nitric acid 50 and the nuclear fuel producing an excessive air-lift effect.

The reaction between the nitric acid 50 and the nuclear fuel in the cut lengths 10 is ill-defined, but is essentially as follows:

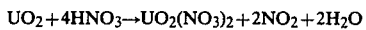

$$UO_2 + 4HNO_3 \rightarrow UO_2(NO_3)_2 + 2NO_2 + 2H_2O$$

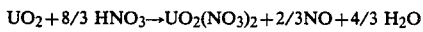

$$UO_2 + 8/3\ HNO_3 \rightarrow UO_2(NO_3)_2 + 2/3 NO + 4/3\ H_2O$$

EXAMPLES (I) 1000 mm length of solid pellets of $UO_2$—5 mm diameter Sheath-stainless steel swaged onto the pellets and open at each end.

Dissolvent—8M near-boiling (80° C.+) nitric acid.

Dissolution time when held upright and immersed in the dissolvent—about 9 days.

(II) 940 mm length of annular pellets of $UO_2$—5 mm outside diameter×1.86 mm inside diameter Sheath-stainless steel swaged onto the pellets and open at each end.

Dissolvent—8M near-boiling nitric acid.

Dissolution time when held upright and immersed in the dissolvent—about 1½ hours.

(III) Example II was repeated but the axial hole through the column was blocked at one point. Only about 10% of the $UO_2$ had dissolved in about 1½ hours.

(IV) 1000 m length of annular pellets of $UO_2$ 5 mm outside diameter×2 mm inside diameter. Sheath-stainless steel swaged onto the pellets and open at each end. At each end of the sheath, the hole through the pellets was reduced to 1 mm diameter for 10 mm along the hole.

The length was treated as in Example II, and had a dissolution time of about 1 hour 45 min.

(V) As Example IV, but the hole through the pellets was reduced to 1 mm diameter for 20 mm from each end of the sheath The length was treated as in Example IV, and had a dissolution time of about 2 hours.

In some applications of the invention, for example that of Example III, it may be desirable to initiate the penetration of the passageway in the cut length by varying the pressure on the dissolvent in the vessel in accordance with the invention described in British Patent Specification No. 2028293A (U.S. Pat. No. 4,294,805) which is incorporated by reference herein. The pressure inside the dissolver 20 might be varied, for example, by connecting the dissolver 20 to a vacuum source (not shown).

It is not essential for the upper ends of the cut lengths of the fuel cartridges to be below the surface of the dissolvent and they may project above the surface. However, too great a projection of the upper ends above the surface will allow the density of the gas/dissolvent mixture in the passageways to balance the static head of the dissolvent in the vessel at the lower ends of the passageways, gas escaping from the upper ends of the passageways but the dissolvent reaching an equilibrium level in the passageways.

Although the invention has been described in relation to the use of annular pellets of nuclear material to provide a liquid permeable passageway therethrough, such a passageway may be provided by an axially displaced hole or groove in the nuclear material. It is not necessary for the passageway to be parallel to the longitudinal axis of the cut length provided that it extends from one end of the cut length to the other, and may for example be provided by the interstices in a permeable porous body of nuclear material, such as a body comprising vibro-compacted nuclear material granules, as demonstrated in the following Example:

(VI) 660 mm length of stainless steel sheath 5 mm inside diameter, and packed with 0.8 mm diameter spheres comprising 90% glass, 10% $UO_2/ThO_2$ gel spheres, the spheres being held in place by stainless steel mesh at each end of the sheath.

Dissolvent—8M near-boiling nitric acid.

Dissolution time when held upright and immersed in the dissolvent—5.8 hours for the dissolution of 42.6% of the $UO_2/ThO_2$.

This Example was repeated when the pressure on the dissolvent was varied in accordance with the above-mentioned British Patent Specification No. 2028293A, 82.4% of the $UO_2/ThO_2$ being dissolved in 5½ hours.

One advantage of the method of the invention, is the considerable reduction in the number of pieces into which the nuclear fuel cartridge need be cut to enable the nuclear material therein to be leached by a dissolvent. The length of these pieces may be at least 150 mm, and conveniently between 300 mm to 1000 mm long. The passageways in these pieces are preferably at least 0.5 mm wide, but narrow passageways might be acceptable particularly when the aforementioned varying pressure is applied to the dissolvent to initiate the penetration of the passageway by the dissolvent. The aforementioned cut lengths of the fuel cartridge might be provided by cutting transversely through a nuclear fuel cluster containing a plurality of nuclear fuel cartridges, and the cut portion of the cluster may then be placed in a dissolver to extract the nuclear material therefrom without removing the cut lengths of the fuel cartridge from the cut portion.

We claim:

1. A method of dissolving nuclear materials from a relatively long length cut from a nuclear fuel cartridge, there being a passageway for the passage of liquid extending from one end of the cut length to the other end thereof and defined at least in part by nuclear material contained in the cut length, wherein the improvement comprises immersing at least a portion of the cut length in a quantity of a liquid dissolvent for the nuclear material such that an end of the cut length is substantially lower than the other end thereof, which dissolvent generates a gas in reacting with the nuclear material in the cut length, whereby bubbles of said gas rise in the passageway and cause an upward flow of the dissolvent in the passageway, thereby causing circulation of said dissolvent through the passageway, said method further comprising containing said dissolvent in a recirculation circuit having a connection from a first portion of the circuit to a second portion of the circuit joined to said first portion so as to define an overflow means over which the dissolvent flows during circulation thereof and a third portion connected to said first portion and arranged relative to said overflow means to provide a path for off-gas evolved from said dissolvent, and inducing circulation of said dissolvent in said recirculation circuit by means creating a thermal differential in the recirculation circuit, said method further comprising locating the cut length in said first portion of said recirculation circuit so that the upward flow of the dissolvent through the said first portion caused by the rise of said gas bubbles assists in providing circulation of the dissolvent over the overflow means and around said recirculation circuit and such that substantially no off-gas evolved from the dissolvent passes over said overflow means and through said connection to said second portion of said recirculation circuit.

2. A method as claimed in claim 1, wherein the cut length is maintained in a substantially upright orientation when immersed in said liquid dissolvent.

3. A method as claimed in claim 2, wherein the upper end of the cut length is at the surface of the dissolvent.

4. A method as claimed in claim 2, wherein the upper end of the cut length is either above or below said surface of the dissolvent.

5. A method as claimed in claim 1, wherein the cut length is between 300 mm to 1000 mm long, and the passageway is at least 0.5 mm wide.

6. A method as claimed in any one of the preceding claims, wherein a plurality of the cut lengths are immersed together in the dissolvent.

7. A method as claimed in claim 6, wherein the plurality of cut lengths is provided by removing a portion from a nuclear fuel cluster containing a plurality of nuclear fuel cartridges disposed in parallel relationship, and placing the portion in the dissolvent without removing the cut lengths of the fuel cartridges from the portion.

8. A method of dissolving nuclear material from a plurality of nuclear fuel cartridges assembled in parrallel relationship in a cluster thereof, there being a relatively long passageway for the passage of liquid extending along and defined at least in part by nuclear material in each said cartridge, wherein the improvement comprises cutting transversely through the cluster to provide a relatively long portion thereof comprising corresponding relatively long portion thereof comprising corresponding relatively long lengths cut from the cartridges each having a liquid passageway therethrough from one end to the other of the cut length, and placing the relatively long portion substantially upright in a dissolvent for the nuclear fuel with the upper end of the portion near the surface of the dissolvent, which dissolvent generates a gas in reacting wth the nuclear material in the cut lengths, whereby bubbles of said gas rise in the passageway, thereby causing upward flow of said dissolvent throoough the passageways, said method further comprising containing said dissolvent in a recirculation circuit having a connection from a first portion of the circuit to a second portion of the cirucit joined to the first portion so as to define an overflow means over which the dissolvent flows during circulation thereof and a third portion connected to said first portion and arranged relative to said overflow means to provide a path for off-gas evolved from said dissolvent and inducing circulation of sad dissolvent in said recirculation circuit by means creating a thermal differential in the recirculation ciruict, the cut length being located in said first portion of said recirculation circuit so that the upward flow o the dissolvent through the siad first portion caused by the rise of said gas bubbles assists in providing circulation f the dissolvent over the overflow means and around said recirculation circuit and over the overflow means and such that substantially no off-gas evolved from the dissolvent passes over said overflow means and through said connection to said second portion of said recirculation circuit.

* * * * *